(12) United States Patent
Zhao

(10) Patent No.: US 12,127,125 B2
(45) Date of Patent: Oct. 22, 2024

(54) SIDELINK COMMUNICATION METHOD AND APPARATUS, AND STORAGE MEDIUM

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 358 days.

(21) Appl. No.: 17/628,879

(22) PCT Filed: Jul. 29, 2019

(86) PCT No.: PCT/CN2019/098233
§ 371 (c)(1),
(2) Date: Jan. 20, 2022

(87) PCT Pub. No.: WO2021/016817
PCT Pub. Date: Feb. 4, 2021

(65) Prior Publication Data
US 2022/0256464 A1 Aug. 11, 2022

(51) Int. Cl.
*H04W 72/20* (2023.01)
*H04W 52/02* (2009.01)
*H04W 72/02* (2009.01)
*H04W 72/0446* (2023.01)
*H04W 72/0453* (2023.01)

(52) U.S. Cl.
CPC ... *H04W 52/0235* (2013.01); *H04W 52/0229* (2013.01); *H04W 72/02* (2013.01); *H04W 72/0446* (2013.01); *H04W 72/0453* (2013.01); *H04W 72/20* (2023.01)

(58) Field of Classification Search
None
See application file for complete search history.

(56) References Cited

U.S. PATENT DOCUMENTS

| | | | |
|---|---|---|---|
| 2019/0044598 A1 | 2/2019 | Talarico et al. | |
| 2019/0356451 A1 | 11/2019 | Zhang et al. | |
| 2020/0288402 A1* | 9/2020 | Nam | H04W 52/0229 |
| 2020/0374856 A1* | 11/2020 | Sarajlic | H04L 27/2607 |
| 2022/0167268 A1* | 5/2022 | Xu | H04W 52/02 |

FOREIGN PATENT DOCUMENTS

| | | |
|---|---|---|
| CN | 107534828 A | 1/2018 |
| CN | 107666691 A | 2/2018 |
| CN | 108307486 A | 7/2018 |
| CN | 108632782 A | 10/2018 |
| CN | 109196939 A | 1/2019 |

(Continued)

OTHER PUBLICATIONS

CN Patent Notice of Allowance in Application No. 201980001468.3, dated Jun. 6, 2022, with English translation,(6p).

(Continued)

*Primary Examiner* — Suhail Khan
(74) *Attorney, Agent, or Firm* — Arch & Lake LLP

(57) ABSTRACT

The present disclosure relates to a sidelink communication method and apparatus, and a storage medium. The sidelink communication method includes: determining to enter an energy-saving state; and canceling a conventional operation on sidelink control information (SCI) in the energy-saving state.

19 Claims, 5 Drawing Sheets

(56) References Cited

FOREIGN PATENT DOCUMENTS

| CN | 109219116 A | 1/2019 |
|---|---|---|
| CN | 111699723 A | 9/2020 |
| WO | 2018028416 A1 | 2/2018 |
| WO | 2018064477 A1 | 4/2018 |

OTHER PUBLICATIONS

International Search Report of PCT/CN2019/098233 dated Apr. 24, 2020 with English translation, (6p).
First Office Action to Chinese Application No. 201980001468.3 dated Oct. 8, 2021 with English translation, (15p).
Ericsson, "On the need of bandwidth parts for NR V2X", 3GPP TSG-RAN WG2 #103-Bis, TDoc R2-1815040, Chengdu, China, Oct. 12, 2018, (2p).
3GPP TS 36.213 V15.4.0 Technical Specification Group Radio Access Network; Evolved Universal Terrestrial Radio Access (E-UTRA; Physical Layer Procedures (Release 15), (544p).

* cited by examiner

SIDELINK COMMUNICATION METHOD AND APPARATUS, AND STORAGE MEDIUM

CROSS-REFERENCE

This application is the U.S. national phase of PCT Application No. PCT/CN2019/098233, filed on Jul. 29, 2019, the content of which is incorporated herein by reference in its entirety for all purposes.

TECHNICAL FIELD

The present disclosure relates to the field of communication technologies, and in particular, to a sidelink communication method and apparatus, and a storage medium.

BACKGROUND

With the recent development of technologies such as autonomous driving, in order to support new sidelink communication technologies, such as vehicle to everything (V2X) services, new requirements have been put forward for performances of V2X technologies.

For sidelink communication devices, V2X in-vehicle users configure a sidelink bandwidth part (BWP) used for sidelink transmission and reception, for example. Each sidelink communication device needs to blindly detect V2X sidelink control information (SCI) sent by other sidelink communication devices in a BWP resource pool, and also needs to perform sensing operations, such as receiving information contained in the SCI sent by other sidelink communication devices such as resource occupation, and measuring sidelink control or data transmission of other sidelink communication devices to avoid possible transmission collisions.

SUMMARY

The present disclosure provides a sidelink communication method and apparatus, and a storage medium.

According to a first aspect of the present disclosure, there is provided a sidelink communication method, which is applied to a sidelink communication device, and includes: determining to enter an energy saving state; and cancelling a conventional operation on sidelink control information (SCI) in the energy saving state.

According to a second aspect of the present disclosure, there is provided a sidelink communication apparatus, including: a processor; and a memory configured to store executable instructions of the processor; wherein, the processor is configured to execute the sidelink communication method in the foregoing first aspect or any one of embodiments thereof.

According to a third aspect of the present disclosure, there is provided a non-transitory computer-readable storage medium, wherein instructions in the storage medium, when executed by a processor of a mobile terminal, cause the mobile terminal to execute the sidelink communication method in the foregoing first aspect thereof.

It should be noted that the above general description and the following detailed description are merely exemplary and explanatory and should not be construed as limiting of the disclosure.

BRIEF DESCRIPTION OF THE DRAWINGS

The accompanying drawings herein are incorporated into the specification and constitute a part of the specification, illustrate examples consistent with the present disclosure, and explain principles of the e present disclosure together with the specification.

DETAILED DESCRIPTION

Figure 1:
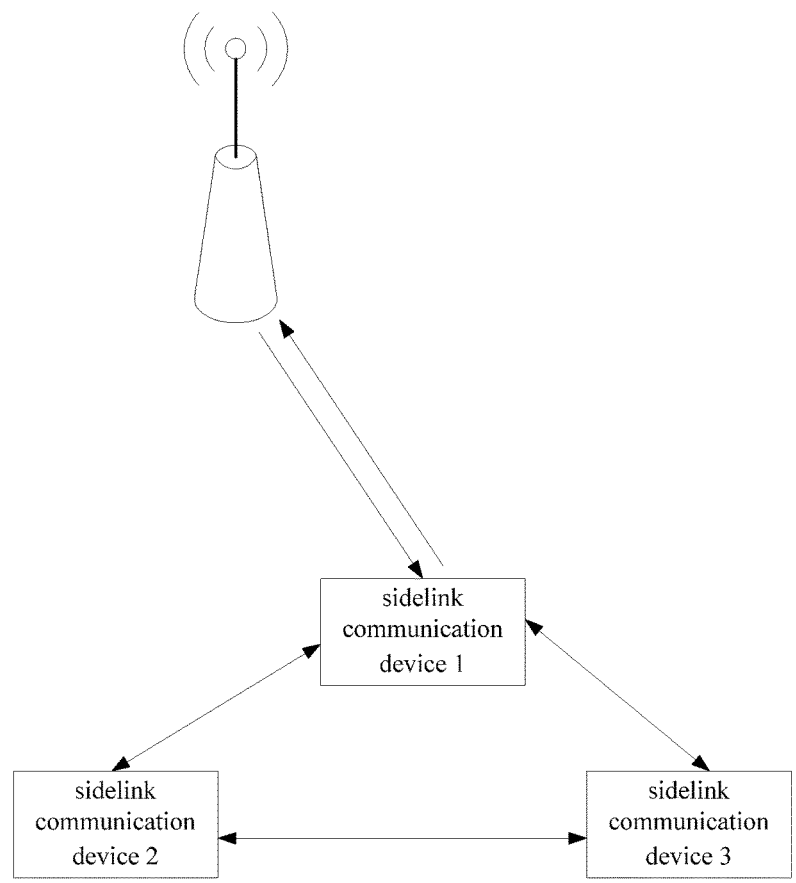
FIG. 1 is a schematic diagram showing a sidelink communication system according to one or more examples of the present disclosure.

Exemplary embodiments will be described in detail here, examples of which are illustrated in the accompanying drawings. The following description refers to the accompanying drawings in which the same numbers in different drawings represent the same or similar elements unless otherwise represented. The implementations set forth in the following description of the exemplary embodiments do not represent all implementations consistent with the present disclosure. Instead, they are merely examples of apparatuses and methods consistent with aspects related to the present disclosure as recited in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

A sidelink communication method provided by examples of the present disclosure can be applied to a sidelink communication system shown in FIG. 1. Referring to FIG. 1, in a scenario where sidelink communication is performed between sidelink communication devices, a network device configures a sidelink communication device 1 with various transmission parameters for data transmission. The sidelink communication device 1 serves as a data sending end, and a sidelink communication device 2 serves as a data receiving end, and these two sidelink communication devices directly communicate with each other. A communication link between the network device and the sidelink communication device is an uplink or a downlink, and a link between the sidelink communication devices is a sidelink. In cellular-vehicle to everything (C-V2X), the communication between the sidelink communication device and other devices can be transferred through a base station and a core network, that is, the uplink and the downlink between a terminal device and the base station in an original cellular network are used for communication; alternatively, the sidelink between the devices can be directly used for communication. Compared with Uu interface communication, sidelink communication has characteristics such as a short delay and a low overhead, and is very suitable for direct communication between the sidelink communication device and other peripheral devices with a close geographical position to the sidelink communication device.

A scenario of the sidelink communication between the sidelink communication devices involved in the present disclosure may be, for example, a vehicle to everything (V2X) scenario, where V represents an vehicle-mounted device, and X represents any object that interacts with the vehicle-mounted device. At present, X mainly includes vehicle-mounted devices, handheld devices, traffic roadside infrastructure and networks. A V2X interaction information mode includes: vehicle to vehicle (V2V) interaction, vehicle to infrastructure (V2I) interaction, vehicle to pedestrian (V2P) interaction, vehicle to network (V2N) interaction. In the present disclosure, a communication scenario of the direct communication between the sidelink communication devices may also be a device to device (D2D) communication scenario. The sidelink communication devices that perform the direct communication in the examples of the present disclosure may include various handheld devices with a wireless communication function, vehicle-mounted devices, wearable devices, computing devices or other processing devices connected to a wireless modem, and various forms of user equipment (UE), mobile stations (MS), terminals, terminal devices, etc. . . . For ease of description, the examples of the present disclosure are described below by taking a V2X communication scenario as an example.

V2X sidelink communication in long term evolution (LTE) can only support some basic security applications of V2x, such as exchanging a basic safety message (BSM) such as a cooperative awareness message (CAM) or a decentralized environmental notification message (DENM) to execute speech broadcasting communication or the like. With the recent development of technologies such as autonomous driving, in order to support new V2X services, new requirements have been put forward for performances of V2X technologies. The use of 5G new radio (NR) technologies to support new V2X communication services and scenarios has been planned as an important content of Rel16 by 3GPP, and the 3GPP service requirement (SA1) working group has established some new service requirements that need to be satisfied by the V2x communication, including vehicles platooning, extended sensors, advanced driving, and remote driving. In general, the NR V2X sidelink needs to provide more reliable communication quality at a fast communication speed with a short communication delay.

In the discussion of NR V2X, a concept of bandwidth part (BWP) is introduced in a design of NR uplink and downlink, and the BWP refers to continuous frequency domain resource blocks (RB) under a given sub-carrier interval on a given carrier frequency. In NR V2X Rel16, similar to an uplink BWP and a downlink BWP, a sidelink BWP used by the sidelink communication device for sidelink transmission and reception is defined. In order to ensure the data transmission and reception between the same arbitrary sidelink communication devices, the same BWP is used to send and receive the data on the sidelink. Each sidelink communication device can only be configured with one sidelink BWP, and it is assumed that all sidelink communication devices are configured with the same BWP.

For the V2X scenario, since a higher communication data throughput requirement between the sidelink communication devices needs to be satisfied, a wider BWP is generally configured. Each sidelink communication device needs to blindly detect V2X sidelink control information (SCI) sent by other sidelink communication devices in a BWP resource pool, and also needs to perform sensing operations, that is, receiving information contained in the SCI sent by other sidelink communication devices such as resource occupation, and measuring sidelink control or data transmission of other sidelink communication devices to avoid possible transmission collisions. These operations make processing complexity and energy consumption of the sidelink communication device higher. For example, in a V2P communication scenario, that is, a communication scenario between the vehicle and the pedestrian ("pedestrian" here can be understood as a general term for slow and vulnerable road participants, including pedestrians, bicycles, scooters, etc., which are collectively referred to as P users hereafter), and the sidelink communication devices of the P users include the handheld devices such as smart phones. These sidelink communication devices use easy-to-carry lithium batteries and are relatively sensitive to energy consumption. In addition, volume and cost limitations of the handheld devices are also high, and accordingly, it is necessary to consider power saving and complexity issues of these sidelink communication devices.

In view of this, the present disclosure provides the sidelink communication method in which an energy saving state is set. In the energy saving state, a conventional operation on the SCI is cancelled, so as to reduce the processing complexity of the sidelink communication device and reduce the energy consumption.

Figure 2:
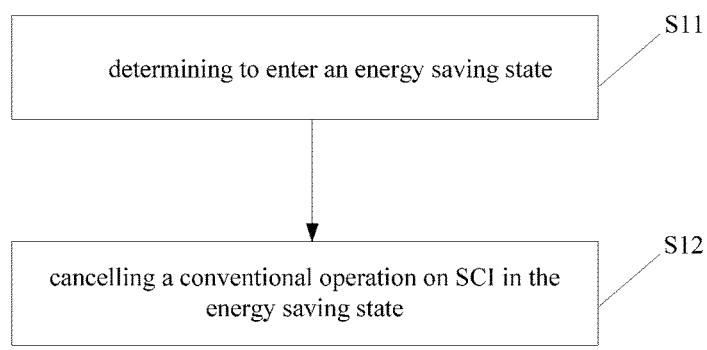
FIG. 2 is a flowchart showing a sidelink communication method according to one or more examples of the present disclosure.

FIG. 2 is a flowchart showing a sidelink communication method according to an example of the present disclosure. As shown in FIG. 2, the sidelink communication method is applied to the sidelink communication device and includes the following steps.

In step S11, it is determined to enter an energy saving state.

In the present disclosure, a condition for the sidelink communication device to enter the energy saving state can be configured. In some examples, set downlink signaling is configured, and when the network device sends the set downlink signaling, and the sidelink communication device has received the set downlink signaling, it is determined to enter the energy saving state. In other examples, a timer is configured. If the sidelink communication device does not receive data within a set time, it is determined to enter the energy saving state. In further examples, a set condition is configured, and when the sidelink communication device satisfies the set condition, it is determined to enter the energy saving state. For example, the configured set condition is that the remaining power of the sidelink communication device is less than a set power threshold, and then it is determined to enter the energy saving state when the remaining power of the sidelink communication device is less than the set power threshold.

In step S12, a conventional operation on SCI is cancelled in the energy saving state.

In the present disclosure, the sidelink communication device no longer performs one or more of the following conventional operations that it usually needs to perform in the energy saving state:

1) Blind Detection of a SCI Transmission in a Resource Pool

Through the blind detection of the SCI transmission, resource occupation information of the corresponding data transmission and whether there is data transmitted to the sidelink communication device itself are learned.

2) Demodulation of SCI Sent by Another Sidelink Communication Device Different from the Sidelink Communication Device In some examples, the SCI sent by a surrounding sidelink communication device is demodulated to determine the resource occupation information in the SCI corresponding to the data transmission.

3) Measurement on a Time-Frequency Resource Corresponding to the Resource Occupation Information Contained in the SCI The measurement is performed on the time-frequency resource corresponding to the resource occupation information contained in the SCI, thereby avoiding selecting the time-frequency resource that is strongly interfered by the data transmission of the surrounding sidelink communication device.

In the present disclosure, the energy saving state is configured, and after it is determined to enter the energy saving state, the execution of the conventional operation on the SCI is cancelled, which can reduce the processing complexity of the sidelink communication device and reduce the energy consumption.

Further, the present disclosure configures a wake-up signal in order to ensure a conventional communication operation of the sidelink communication device. The sidelink communication device that has entered the energy saving state monitors the wake-up signal, and exits the energy saving state if it has monitored the wake-up signal.

Figure 3:
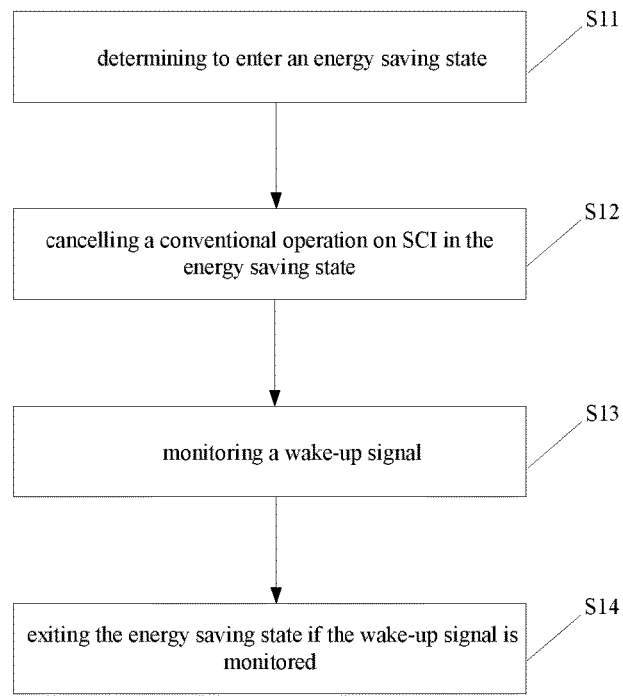
FIG. 3 is a flowchart showing a sidelink communication method according to one or more examples of the present disclosure.

FIG. 3 is a flowchart showing a sidelink communication method according to an example of the present disclosure. As shown in FIG. 3, the sidelink communication method is applied to the sidelink communication device. The sidelink communication method shown in FIG. 3 further includes the following steps on the basis of the sidelink communication method shown in FIG. 2.

In step S13, a wake-up signal is monitored.

In step S14, if the wake-up signal is monitored, the energy saving state is exited.

In some examples, the wake-up signal of the present disclosure may be a set physical layer signal, and the sidelink communication device that has entered the energy saving state may exit the energy saving state if it has received the set physical layer signal.

The set physical layer signal in the present disclosure may be a sequence-based physical layer signal to facilitate modulation or demodulation.

In some examples, the sequence-based physical layer signal may be a pseudo-random sequence. The sequence-based physical layer signal in the present disclosure may be related to an identity of the sidelink communication device itself, or may be independent of the identity of the sidelink communication device itself. For example, the physical layer signal involved in the present disclosure may be one of the following pseudo-random sequences:

a pseudo-random sequence generated by using a set identity (a fixed identity), or a pseudo-random sequence generated by using a current time, or a pseudo-random sequence generated by using the identity of the sidelink communication device, or a pseudo-random sequence generated by using a transformed identity of the identity of the sidelink communication device.

The present disclosure can use not only a current slot number, but also the identity of the sidelink communication device or the set identity to generate the pseudo-random sequence. In some examples, in an uplink control transmission, a sequence group number can be set to be determined by the set identity, and a cyclic shift value of the sequence is determined by the current time.

In some examples, the present disclosure may configure a time-frequency resource for monitoring the wake-up signal, and the time-frequency resource may be a periodic time-frequency resource. The sidelink communication device that has entered the energy saving state monitors the wake-up signal on the periodic time-frequency resource, and exits the energy saving state if the wake-up signal is monitored.

Figure 4:
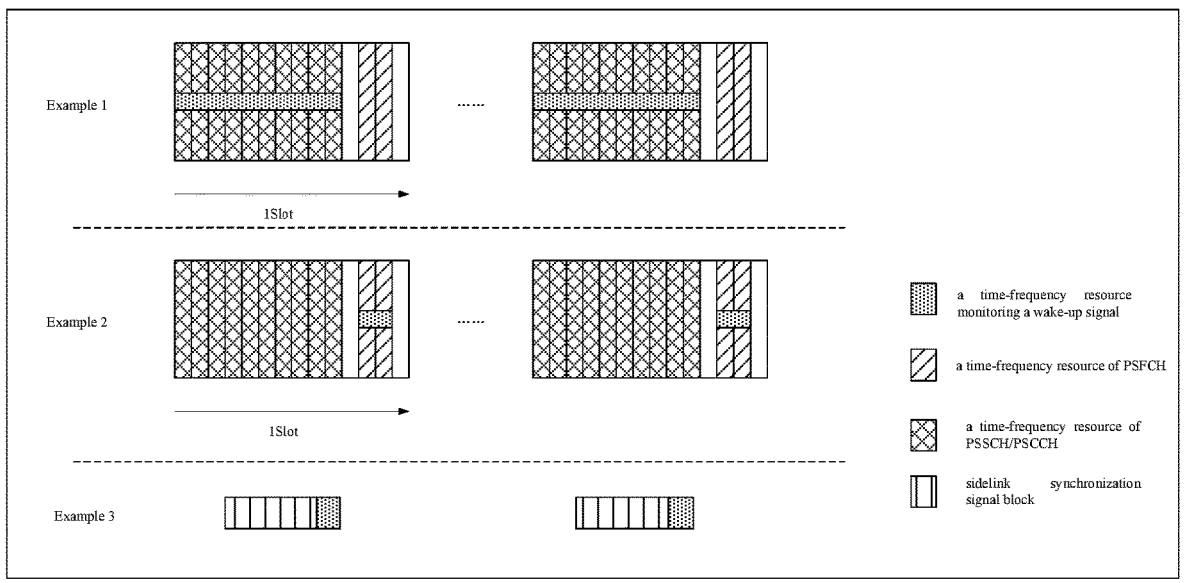
FIG. 4 is a schematic diagram showing an orthogonal manner for a periodic time-frequency resource according to one or more examples of the present disclosure.

In some examples, the periodic time-frequency resource configured in the present disclosure is orthogonal to a time-frequency resource occupied by another sidelink communication signal or channel in a time division or frequency division manner, avoiding the occurrence of the time-frequency resource for the sidelink communication device to monitor the wake-up signal the same as the time-frequency resource occupied by the other sidelink communication signal or channel to avoid possible transmission collisions. It can be understood that the other sidelink communication signal or channel involved in the present disclosure is a sidelink communication signal or channel different from the wake-up signal. For example, the periodic time-frequency resource involved in the present disclosure may be an exemplary periodic time-frequency resource shown in FIG. 4. In FIG. 4, in Example 1, the periodic time-frequency resource used to monitor the wake-up signal can be orthogonal to a time-frequency resource occupied by a physical sidelink shared channel (PSSCH) or a physical sidelink control channel (PSCCH) in the frequency division manner, and also be orthogonal to a time-frequency resource occupied by a time-frequency resource occupied by a physical sidelink feedback channel (PSFCH). In Example 2, the periodic time-frequency resource used to monitor the wake-up signal may be orthogonal to the time-frequency resource occupied by the physical sidelink feedback channel (PSFCH) in the frequency division manner, and may also be orthogonal to the time-frequency resources occupied by the PSSCH and PSCCH. In Example 3, the periodic time-frequency resource used to monitor the wake-up signal can be orthogonal to a time-frequency resource occupied by a sidelink synchronization signal block in the time division manner.

In the present disclosure, the above involved periodic time-frequency resource is determined based on pre-configuration information, or based on downlink configuration information.

The pre-configuration information or the downlink configuration information includes a period of the time-frequency resource; or a position of a frequency resource occupied by the time-frequency resource; or a slot offset value of the time-frequency resource relative to a starting subframe in a time domain. In some examples, the pre-configuration information or the downlink configuration information may include the period of the time-frequency resource configured in units of symbols, slots, subframes, etc., or configured in units of milliseconds, seconds, etc. Alternatively, the pre-configuration information or the downlink configuration information may include the position of the frequency resource occupied by the time-frequency resource at each period, for example, a starting RB, the number of occupied RBs or a terminating RB may be configured. Alternatively, the pre-configuration information or the downlink configuration information may include the slot offset value of the time-frequency resource relative to a first slot in the starting frame with a frame number 0 in the time domain or other information.

In some examples of the present disclosure, the periodic time-frequency resource is located on a set BWP. A bandwidth of the set BWP is smaller than a bandwidth of the sidelink BWP, that is, the set BWP can be understood as a sidelink receiving BWP that has a narrower bandwidth and contains the periodic time-frequency resource. The sidelink communication device switches from an original sidelink BWP to a narrower sidelink receiving BWP that contains a monitoring frequency resource, which can save energy. In the present disclosure, when the sidelink communication device enters the energy saving state, the BWP used by the sidelink communication device for sending and receiving the data on the sidelink can be switched to the set BWP, or the sidelink communication device can keep using the original sidelink BWP. When the sidelink communication device exits the energy saving state, the BWP used by the sidelink communication device for sending and receiving the data on the sidelink needs to be switched back to the original sidelink BWP.

In other examples, in the sidelink communication method provided by the present disclosure, when the sidelink communication device needs to communicate with another sidelink communication device in the energy saving state, the sidelink communication device may also send the wake-up signal to make the other sidelink communication device in the energy saving state exit the energy saving state.

Figure 5:
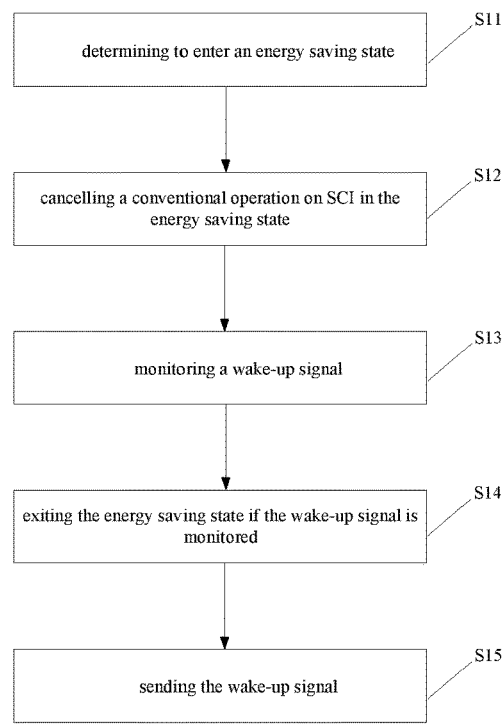
FIG. 5 is a flowchart showing a sidelink communication method according to one or more examples of the present disclosure.

FIG. 5 is a flowchart showing a sidelink communication method according to an example of the present disclosure. As shown in FIG. 5, the sidelink communication method is applied to the sidelink communication device. The sidelink communication method shown in FIG. 5 further includes the following steps on the basis of the sidelink communication method shown in FIG. 3.

In step S15, the wake-up signal is sent.

In the present disclosure, the sidelink communication device may also send the wake-up signal on the above configured periodic time-frequency resource to make the other sidelink communication device in the energy saving state exit the energy saving state.

Figure 6:
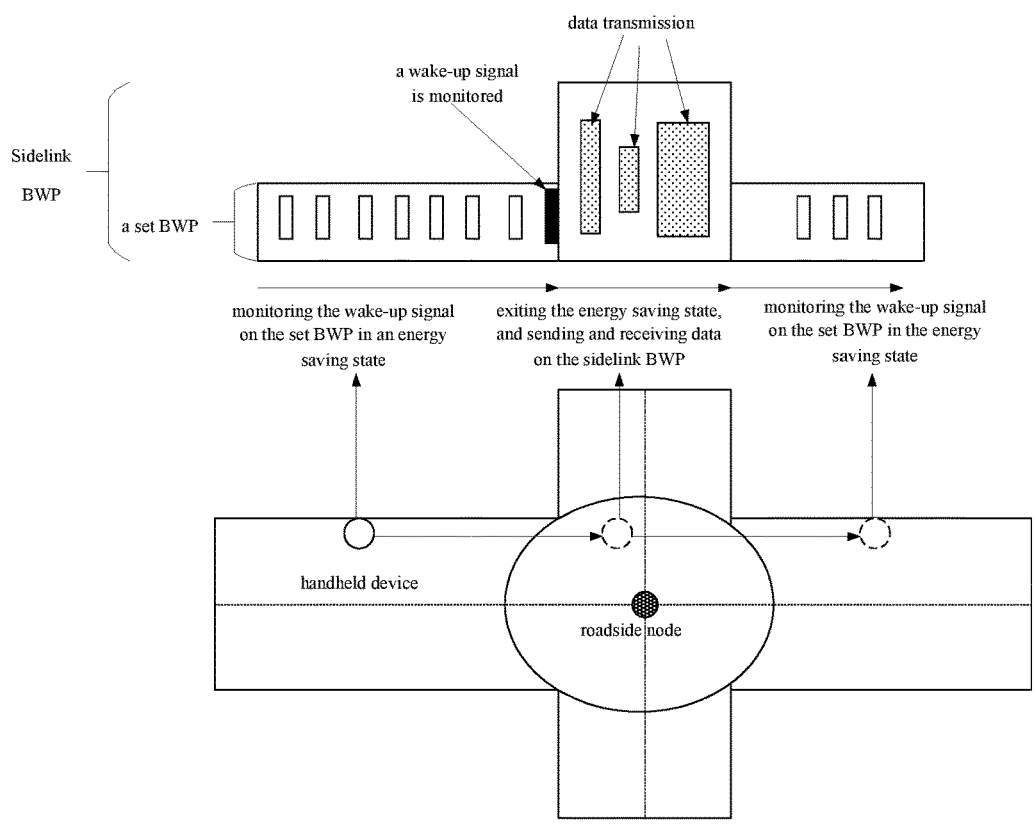
FIG. 6 is a schematic diagram of a sidelink communication procedure shown in one or more examples.

FIG. 6 is a schematic diagram of a sidelink communication procedure shown in an exemplary application scenario. As shown in FIG. 6, a pedestrian carries a handheld device that is in the energy saving state. A roadside node is disposed at an intersection where the pedestrian and vehicles may meet, and the roadside node is in the energy saving state and periodically sends the wake-up signal on the periodic time-frequency resource. The handheld device in the energy saving state monitors the wake-up signal on the set BWP when it is far away from the intersection. When the pedestrian approaches the intersection with the handheld device in the energy saving state, the handheld device in the energy saving state receives the wake-up signal sent by the roadside node and exits the energy saving state. The handheld device that has exited the energy saving state sends and receives V2X data from other sidelink communication devices (such as, the vehicles) on a sidelink BWP. When the pedestrian leaves the intersection, the handheld device carried by the pedestrian can switch back to the energy saving state, and the handheld device in the energy saving state monitors the wake-up signal on the set BWP.

In other examples of the present disclosure, if the sidelink communication device has data to be sent, it is determined whether to exit the energy saving state according to a type of the data to be sent, so as to achieve better energy saving or better assurance of the communication with the other sidelink communication device.

Figure 7:
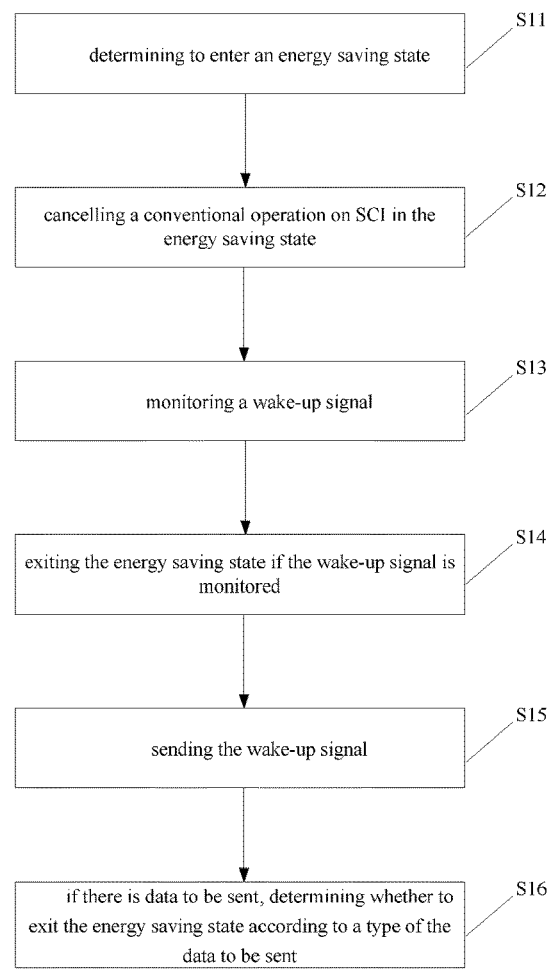
FIG. 7 is a flowchart showing a sidelink communication method according to one or more examples of the present disclosure.

FIG. 7 is a flowchart showing a sidelink communication method according to an example of the present disclosure. As shown in FIG. 7, the sidelink communication method is applied to the sidelink communication device. The sidelink communication method shown in FIG. 7 further includes the following steps on the basis of the sidelink communication method shown in FIG. 5.

In step S16, if there is data to be sent, it is determined whether to exit the energy saving state according to a type of the data to be sent.

In the present disclosure, if the type of the data to be sent is groupcast or unicast data that needs to receive feedback information, the energy saving state is exited, so as to better receive the feedback information and/or the data sent by other sidelink communication devices. If the type of the data to be sent is broadcast data that does not need to receive the feedback information, the energy saving state is maintained.

In the sidelink communication method provided by the present disclosure, when the sidelink communication device determines to enter the energy saving state, it cancels the execution of the conventional operation on the SCI, and monitors the wake-up signal in the energy saving state, or determines whether to exit the energy saving state according to the type of the data to be sent, so as to timely exit the energy saving state to ensure the normal communication with other sidelink communication devices.

Based on the same concept, the examples of the present disclosure also provide a sidelink communication apparatus.

It can be understood that, in order to implement the above-mentioned functions, the sidelink communication method and apparatus provided by the examples of the present disclosure include corresponding hardware structures and/or software modules configured to perform respective functions. In combination with units and algorithm steps of various examples disclosed in the examples of the present disclosure, the examples of the present disclosure may be implemented by in a form of hardware or a combination of the hardware and computer software. Whether a certain function is implemented in the fashion of hardware or in a fashion that the computer software drives the hardware depends on particular applications and design constraints of the technical solution. A person skilled in the art may implement the described functions with different methods for each of particular applications, but such an implementation shall not be regarded as going beyond the scope of the technical solution according to the examples of the present disclosure.

Figure 8:
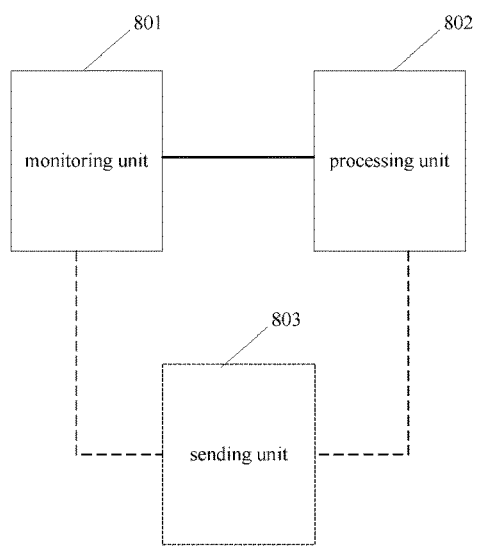
FIG. 8 is a block diagram showing a sidelink communication apparatus according one or more examples of the present disclosure.

FIG. 8 is a block diagram of a sidelink communication apparatus according to an example of the present disclosure of the present disclosure. Referring to FIG. 8, a sidelink communication apparatus 800 is applied to the sidelink communication device, and includes a monitoring unit 801 and a processing unit 802.

The monitoring unit 801 is configured to determine to enter an energy saving state. The processing unit 802 is configured to cancel a conventional operation on SCI in the energy saving state.

The cancelling the conventional operation on the SCI includes one or a combination of the following operations:

cancelling blind detection of a SCI transmission in a resource pool, cancelling demodulation of SCI sent by other sidelink communication devices different from the sidelink communication device, and cancelling measurement on a time-frequency resource corresponding to resource occupation information contained in the SCI.

In some examples, the monitoring unit 801 is further configured to: monitor a wake-up signal on a periodic time-frequency resource in the energy saving state; and exit the energy saving state if the wake-up signal is monitored.

The periodic time-frequency resource is orthogonal to a time-frequency resource occupied by another sidelink communication signal or channel in a time division or frequency division manner, and the other sidelink communication signal or channel is a sidelink communication signal or channel different from the wake-up signal.

In some examples, the periodic time-frequency resource is determined based on pre-configuration information, or is determined based on downlink configuration information.

The pre-configuration information or the downlink configuration information includes: a period of the time-frequency resource; or a position of a frequency resource occupied by the time-frequency resource; or a slot offset value of the time-frequency resource relative to a starting subframe in a time domain.

The periodic time-frequency resource is located on a set bandwidth part, and a bandwidth of the set bandwidth part is smaller than a bandwidth of a sidelink bandwidth part.

In some examples, the wake-up signal is a sequence-based physical layer signal.

The sequence-based physical layer signal is one of the following pseudo-random sequences:

a pseudo-random sequence generated by using a set identity, a pseudo-random sequence generated by using a current time, a pseudo-random sequence generated by using an identity of the sidelink communication device, and a pseudo-random sequence generated by using a transformed identity of the identity of the sidelink communication device.

In some examples, the sidelink communication device 800 involved in the present disclosure further includes a sending unit 803, and the sending unit 803 is configured to send the wake-up signal on the periodic time-frequency resource.

The monitoring unit 801 is configured to determine to enter the energy saving state in the following manner:

determining to enter the energy saving state based on set downlink signaling, or determining to enter the energy saving state based on not receiving data within a set time, or determining to enter the energy saving state based on satisfying a set condition by the sidelink communication device.

In some examples, the monitoring unit 801 is further configured to, if there is data to be sent, determine whether to exit the energy saving state according to the type of data to be sent.

If the type of the data to be sent is groupcast or unicast data that needs to receive feedback information, the energy saving state is exited, and if the type of the data to be sent is broadcast data that does not need to receive the feedback information, the energy saving state is maintained.

Regarding the apparatus in the foregoing examples, a specific manner in which each module performs operations has been described in detail in method examples, and a detailed description will not be given here.

Figure 9:
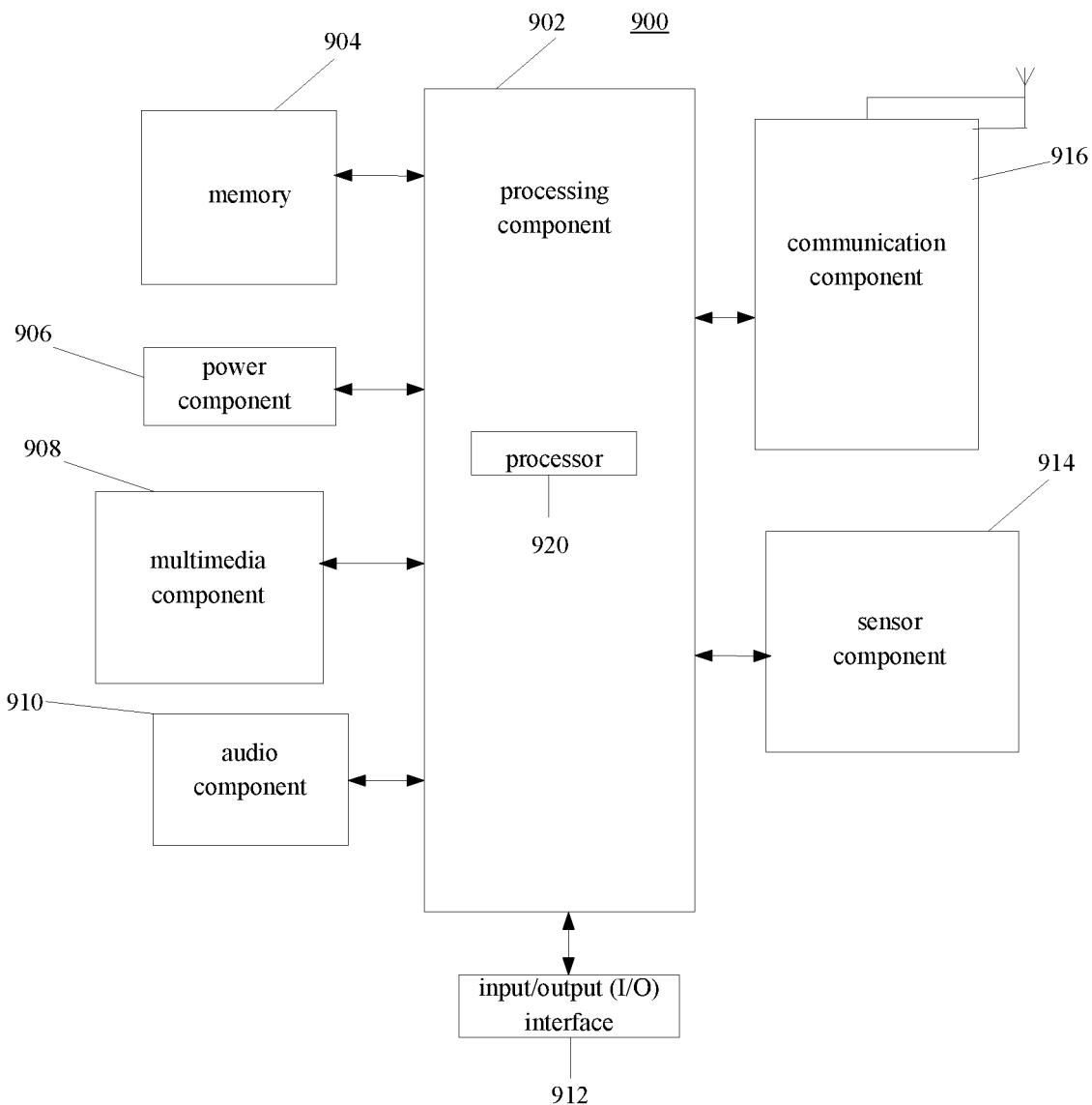
FIG. 9 is a block diagram showing a device according to one or more examples of the present disclosure.

FIG. 9 is a block diagram showing a device 900 for sidelink communication according to an example of the present disclosure. For example, the device 900 may be a mobile phone, a computer, a digital broadcasting terminal, a messaging device, a game console, a tablet device, a medical device, a fitness device, a personal digital assistant, etc.

Referring to FIG. 9, the device 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the device 900, such as the operations associated with display, telephone calls, data communications, camera operations, and recording operations. The processing component 902 can include one or more processors 920 to execute instructions to perform all or part of the steps in the above described methods. Moreover, the processing component 902 can include one or more modules to facilitate the interaction between the processing component 902 and other components. For example, the processing component 902 can include a multimedia module to facilitate the interaction between the multimedia component 908 and the processing component 902.

The memory 904 is configured to store various types of data to support the operation of the device 900. Examples of such data include instructions for any application or method operated on the device 900, contact data, phone book data, messages, pictures, videos, and the like. The memory 904 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 906 provides power to various components of the device 900. The power component 906 can include a power management system, one or more power sources, and other components associated with the generation, management, and distribution of power in the device 900.

The multimedia component 908 includes a screen providing an output interface between the device 900 and a user. In some examples, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a time period and a pressure associated with the touch or swipe action. In some examples, the multimedia component 908 includes a front camera and/or a rear camera. When the device 900 is in an operation mode, such as a photographing mode or a video mode, the front camera and/or the rear camera can receive external multimedia data. Each of the front camera and the rear camera may be a fixed optical lens system or have focus and optical zoom capability.

The audio component 910 is configured to output and/or input an audio signal. For example, the audio component 910 includes a microphone (MIC) configured to receive an external audio signal when the device 900 is in an operation mode, such as a call mode, a recording mode, and a voice recognition mode. The received audio signal may be further stored in the memory 904 or sent via the communication component 916. In some examples, the audio component 910 also includes a speaker for outputting the audio signal.

The I/O interface 912 provides an interface between the processing component 902 and peripheral interface modules, such as a keyboard, a click wheel, buttons, and the like. These buttons may include, but are not limited to, a home button, a volume button, a starting button, and a locking button.

The sensor component 914 includes one or more sensors for providing state assessments of various aspects of the device 900. For example, the sensor component 914 can detect an open/closed state of the device 900, relative positioning of components, such as the display and the keypad of the device 900. The sensor component 914 can also detect a change in position of one component of the device 900 or the device 900, the presence or absence of the user contact with the device 900, an orientation, or an acceleration/deceleration of the device 900, and a change in temperature of the device 900. The sensor component 914 can include a proximity sensor configured to detect the presence of nearby objects without any physical contact. The sensor component 914 can also include a light sensor, such as a CMOS or CCD image sensor, configured to use in imaging applications. In some examples, the sensor component 914 can also include an accelerometer sensor, a gyroscope sensor, a magnetic sensor, a pressure sensor, or a temperature sensor.

The communication component 916 is configured to facilitate wired or wireless communication between the device 900 and other devices. The device 900 can access a wireless network based on a communication standard, such as WiFi, 2G or 3G or 5G, or a combination thereof. In an example, the communication component 916 receives broadcast signals or broadcast associated information from an external broadcast management system via a broadcast channel. In an example, the communication component 916 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In an example, the device 900 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components to execute the above method.

In an example, there is also provided a non-transitory computer-readable storage medium including instructions, such as a memory 904 including instructions executable by the processor 920 of the device 900 to perform the above described method. For example, the non-transitory computer readable storage medium may be a ROM, a random access memory (RAM), a CD-ROM, a magnetic tape, a floppy disc, and an optical data storage device.

It should be understood that the term "a plurality of" or "multiple" mentioned herein means two or more, and other quantifiers are similar. The term "and/or" describes an association relationship of associated objects, indicating three types of relationships, for example, A and/or B may indicate three situations: A exists alone, A and B exist simultaneously, and B exists alone. The symbol "/" generally indicates an "or" relationship between the contextual objects. The singular forms "a", "said" and "the" are also intended to include plural forms, unless the context clearly indicates other meanings.

It can be understood that although operations in the examples of the present disclosure are described in a specific order in the drawings, they should not be understood as requiring that the operations be performed in the specific order shown or in a serial order, or that perform all the operations shown to get the desired result. In certain environments, multitasking and parallel processing may be advantageous.

Other examples of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and examples are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:
1. A sidelink communication method, comprising:
   determining, by a sidelink communication device, to enter an energy saving state; and
   cancelling, by the sidelink communication device, a conventional operation on sidelink control information (SCI) in the energy saving state;
   wherein the sidelink communication method further comprises:
   in response to detecting that data to be sent exists, determining whether to exit the energy saving state according to a type of the data to be sent;

wherein in response to determining the type of the data to be sent is groupcast or unicast data that needs to receive feedback information, the energy saving state is exited; and in response to determining the type of the data to be sent is broadcast data that does not need to receive the feedback information, the energy saving state is maintained.

2. The sidelink communication method according to claim 1, wherein cancelling the conventional operation on the SCI comprises at least one of following operations:

cancelling blind detection of a SCI transmission in a resource pool;

cancelling demodulation of SCI sent by other sidelink communication devices different from the sidelink communication device; or cancelling measurement on a time-frequency resource corresponding to resource occupation information contained in the SCI.

3. The sidelink communication method according to claim 1, further comprising:

monitoring a wake-up signal on a periodic time-frequency resource in the energy saving state; and exiting the energy saving state if the wake-up signal is monitored.

4. The sidelink communication method according to claim 3, wherein the periodic time-frequency resource is orthogonal to a time-frequency resource occupied by another sidelink communication signal or channel in a time division or frequency division manner, and wherein the other sidelink communication signal or channel is a sidelink communication signal or channel different from the wake-up signal.

5. The sidelink communication method according to claim 3, wherein the periodic time-frequency resource is determined based on pre-configuration information, or the periodic time-frequency resource is determined based on downlink configuration information.

6. The sidelink communication method according to claim 5, wherein the pre-configuration information or the downlink configuration information comprises at least one of following parameters:

a period of the time-frequency resource;

a position of a frequency resource occupied by the time-frequency resource; or a slot offset value of the time-frequency resource relative to a starting subframe in a time domain.

7. The sidelink communication method according to claim 3, wherein the periodic time-frequency resource is located on a set bandwidth part, and a bandwidth of the set bandwidth part is smaller than a bandwidth of a sidelink bandwidth part.

8. The sidelink communication method according to claim 3, wherein the wake-up signal is a sequence-based physical layer signal.

9. The sidelink communication method according to claim 8, wherein the sequence-based physical layer signal is one of following pseudo-random sequences:

a pseudo-random sequence generated by using a set identity;

a pseudo-random sequence generated by using a current time;

a pseudo-random sequence generated by using an identity of the sidelink communication device; and a pseudo-random sequence generated by using a transformed identity of the identity of the sidelink communication device.

10. The sidelink communication method according to claim 3, further comprising:

sending the wake-up signal on the periodic time-frequency resource.

11. The sidelink communication method according to claim 1, wherein determining to enter the energy saving state comprises at least one of following operations:

determining to enter the energy saving state based on set downlink signaling;

determining to enter the energy saving state based on not receiving data within a set time; or determining to enter the energy saving state based on satisfying a set condition by the sidelink communication device.

12. A sidelink communication apparatus, comprising:

a processor; and a memory configured to store executable instructions of the processor;

wherein, the processor is configured to:

determine to enter an energy saving state; and cancel a conventional operation on sidelink control information (SCI) in the energy saving state;

wherein the processor is further configured to:

in response to detecting that data to be sent exists, determine whether to exit the energy saving state according to a type of the data to be sent;

wherein in response to determining the type of the data to be sent is groupcast or unicast data that needs to receive feedback information, the energy saving state is exited; and in response to determining the type of the data to be sent is broadcast data that does not need to receive the feedback information, the energy saving state is maintained.

13. The sidelink communication apparatus according to claim 12, wherein the processor is further configured to:

cancel blind detection of a SCI transmission in a resource pool;

cancel demodulation of SCI sent by other sidelink communication devices different from the sidelink communication device; and cancel measurement on a time-frequency resource corresponding to resource occupation information contained in the SCI.

14. The sidelink communication apparatus according to claim 12, wherein the processor is further configured to:

monitor a wake-up signal on a periodic time-frequency resource in the energy saving state; and exit the energy saving state if the wake-up signal is monitored.

15. The sidelink communication apparatus according to claim 14, wherein the periodic time-frequency resource is orthogonal to a time-frequency resource occupied by another sidelink communication signal or channel in a time division or frequency division manner, and wherein the other sidelink communication signal or channel is a sidelink communication signal or channel different from the wake-up signal.

16. The sidelink communication apparatus according to claim 14, wherein the periodic time-frequency resource is determined based on pre-configuration information, or is determined based on downlink configuration information.

17. The sidelink communication apparatus according to claim 16, wherein the pre-configuration information or the downlink configuration information comprises at least one of following parameters:

a period of the time-frequency resource;

a position of a frequency resource occupied by the time-frequency resource; or a slot offset value of the time-frequency resource relative to a starting subframe in a time domain.

18. The sidelink communication apparatus according to claim 14, wherein the periodic time-frequency resource is located on a set bandwidth part, and a bandwidth of the set bandwidth part is smaller than a bandwidth of a sidelink bandwidth part.

19. A non-transitory computer-readable storage medium, wherein instructions in the storage medium, when executed by a processor of a mobile terminal, cause the mobile terminal to execute following operations:

determining to enter an energy saving state; and cancelling a conventional operation on sidelink control information (SCI) in the energy saving state;

wherein the instructions cause the mobile terminal to further execute following operations:

in response to detecting that data to be sent exists, determining whether to exit the energy saving state according to a type of the data to be sent;

wherein in response to determining the type of the data to be sent is groupcast or unicast data that needs to receive feedback information, the energy saving state is exited; and in response to determining the type of the data to be sent is broadcast data that does not need to receive the feedback information, the energy saving state is maintained.

* * * * *